Patented Sept. 18, 1923.

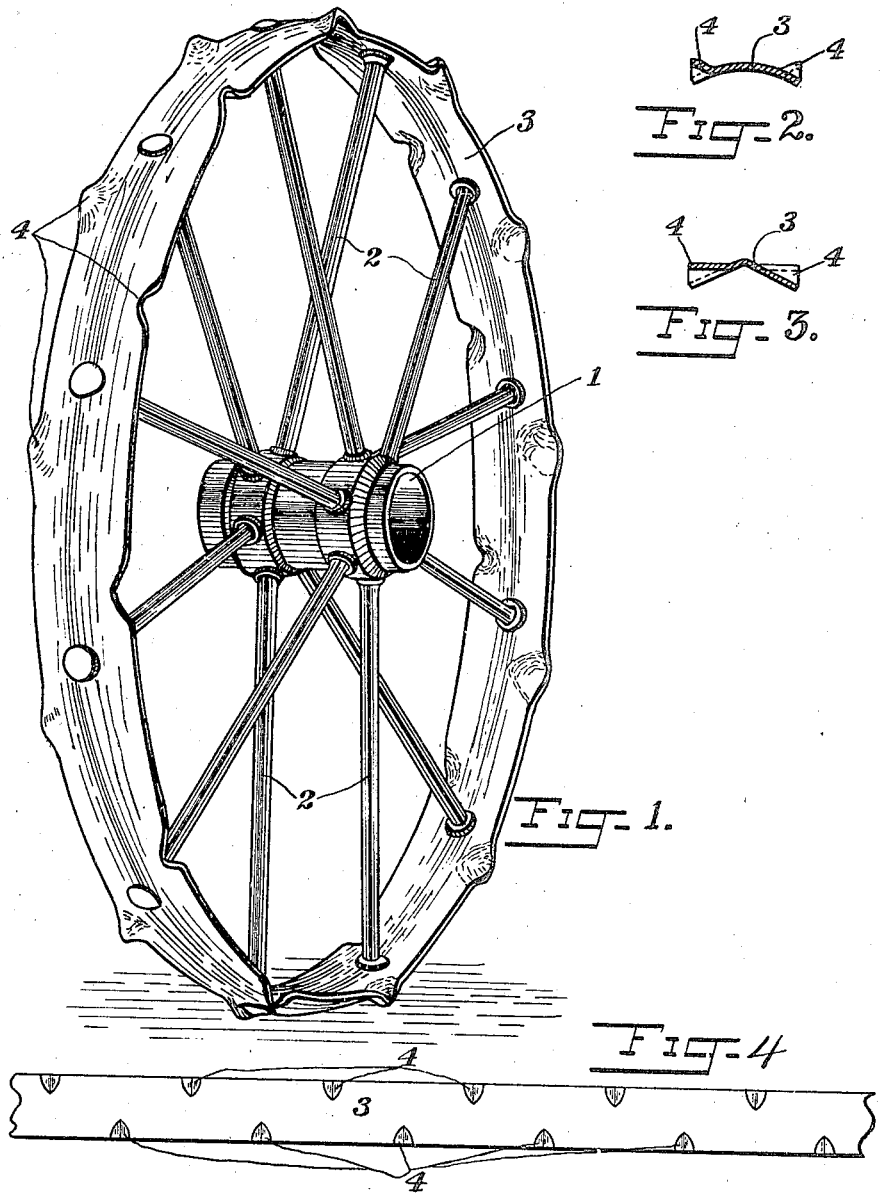

1,467,999

UNITED STATES PATENT OFFICE.

THEOPHILUS BROWN, OF MOLINE, ILLINOIS, ASSIGNOR TO DEERE & COMPANY, OF MOLINE, ILLINOIS, A CORPORATION OF ILLINOIS.

WHEEL.

Application filed August 22, 1921. Serial No. 494,035.

*To all whom it may concern:*

Be it known that I, THEOPHILUS BROWN, a citizen of the United States, residing at Moline, in the county of Rock Island and State of Illinois, have invented certain new and useful Improvements in Wheels, of which the following is a specification, reference being had therein to the accompanying drawing.

My invention relates to wheels, and has to do particularly with traction wheels such as are commonly used where the wheel is employed as a source of power, either to propel the article to which it is applied, or for driving mechanism with which it may be associated, such, for example, as in agricultural implements of various kinds. As is well known, the rims or tires of such wheels are usually provided with outwardly projecting lugs adapted to embed themselves in the roadway or soil so as to prevent slippage, and one of the objects of my invention is to provide a wheel with a sheet metal rim having outwardly projecting lugs which will operate to engage the ground when such engagement is necessary to prevent slippage, as where the wheel is traveling on soft ground, but which will not project outwardly beyond the crown of the wheel to any material extent, so that the lugs will not interfere with the smooth running of the wheel on hard roads. With the common form of traction wheel, when the wheel is running on a road too hard for the lugs to be embedded in it, much jolting is caused, which is injurious to the machinery and uncomfortable to the driver, and besides the lugs are apt to damage the roadway, and by my improvement I have provided a wheel which avoids these objections. A further object of my invention is to provide a traction wheel which will be comparatively light in weight, but strong and substantial in construction, and one which may be manufactured economically. I accomplish these objects as illustrated in the drawings and as hereinafter described. What I regard as new is set forth in the claims.

In the accompanying drawings,—

Fig. 1 is a perspective view of a wheel embodying my improvement;

Fig. 2 is a cross-section of the wheel rim shown in Fig. 1;

Fig. 3 is a cross-sectional view showing a modification; and

Fig. 4 is a plan view of a strip of sheet metal used in making the wheel rim, showing its appearance after the lugs have been formed in the margins thereof but before the strip has been otherwise shaped to form the rim.

Referring to the drawings,—1 indicates the wheel hub, 2 the spokes and 3 the rim, all of which are preferably of metal. The rim itself consists of a strip of sheet metal of suitable width and thickness, in the side margins of which are formed at intervals a series of lugs 4 produced by offsetting or corrugating the metal so that the lugs project outwardly or radially beyond the outer surface of the rim with their highest elevation at the rim margins. As clearly shown in Fig. 1, the sides of the lugs slope downwardly from the apices thereof and merge at the bases of the lugs into the outer surface of the rim, thereby stiffening and strengthening the lugs, as well as adding to the strength of the wheel. As shown in Figs. 2 and 3, the rim is arcuate, or approximately so, in cross section, its convex surface being outermost, and its crown forming an intermediate tread portion on which the wheel runs when on a hard road or pavement. It will be noted, also, that the lugs 4 do not project beyond the crown of the rim, but their outer extremities are substantially level therewith, as clearly shown in Fig. 2. Consequently when the wheel runs on a hard road it has a smooth running surface formed by the intermediate tread portion above referred to, and accordingly there is no jolting, and no damage is done to the roadway. On the other hand, when the ground is soft so that the crown of the rim sinks into it, the lugs 4 are embedded in the ground and provide traction sufficient to prevent slippage. The lugs 4 are spaced a suitable distance apart and those at one margin of the wheel are staggered relatively to those at the other margin thereof. The outer ends of the spokes project through the crown of the wheel rim and are fixedly secured directly thereto by upsetting their outer ends, as illustrated in Fig. 1. As therein shown, the spokes are connected to the rim in staggered relation to the lugs, so that the holes in the rim made to receive the ends of the spokes are placed at the greatest possible distance from the lugs. Consequently the rim is not weakened adjacent to the lugs by the removal of material therefrom.

The rim is preferably made by first forming the lugs in a blank or strip of sheet metal, as illustrated in Fig. 4, and afterwards shaping the metal to the form described, but this is not essential as the wheel may be constructed without the lugs and the latter be formed in the rim by the operation of suitable mechanism, or the strip of metal may be rolled and the lugs formed by the same operation.

What I claim is—

1. A metal wheel comprising a hub, a sheet metal rim having a substantially smooth intermediate tread surface and having its margins bent outwardly at intervals to form lugs, the external diameter of the rim at such tread surface being greater than its marginal diameter between such lugs, and spokes connected directly to the rim, and to the hub.

2. A metal wheel comprising a hub, a sheet metal rim arcuate in cross-section and having its margins bent outwardly at intervals to form lugs the outer extremities of which are substantially level with the crown of the rim, and spokes connected directly to the rim, and to the hub.

3. A metal wheel comprising a hub, a sheet metal rim having its margins bent outwardly at intervals to form lugs, the lugs at one side of the rim being in staggered relation to those at the opposite side thereof, and spokes connected directly to the rim in staggered relation to said lugs, and to the hub.

4. A metal wheel comprising a hub, a sheet metal rim having its marginal portions bent outwardly at intervals to form lugs having their greatest elevation at the margins of the rim, said lugs merging at their bases into the outer surface of the rim, and spokes connected directly to the rim, and to the hub.

THEOPHILUS BROWN.